United States Patent [19]

Batterman et al.

[11] Patent Number: 4,676,991

[45] Date of Patent: Jun. 30, 1987

[54] SWEETENER COMPOSITION

[75] Inventors: Cynthia K. Batterman; Michael E. Augustine, both of Decatur; James R. Dial, Moweaqua, all of Ill.

[73] Assignee: A. E. Staley Manufacturing Company, Decatur, Ill.

[21] Appl. No.: 855,540

[22] Filed: Apr. 23, 1986

[51] Int. Cl.$^4$ .................. C13K 1/00; A23L 1/187; A23L 2/00

[52] U.S. Cl. .................. 426/658; 426/660; 426/590; 426/578; 426/554; 127/30; 127/58; 127/63

[58] Field of Search .............. 426/658, 578, 590, 554; 127/58, 30, 63

[56] References Cited

U.S. PATENT DOCUMENTS

| | | | |
|---|---|---|---|
| 3,816,175 | 6/1974 | Melaja | 127/60 |
| 3,929,503 | 12/1975 | Yamauchi . | |
| 3,995,072 | 11/1976 | Thaler et al. . | |
| 4,224,353 | 9/1980 | Kneper et al. . | |
| 4,303,684 | 12/1984 | Pitchen . | |
| 4,313,967 | 2/1982 | Kahn et al. . | |
| 4,379,171 | 4/1983 | Furda et al. | 426/291 |
| 4,513,016 | 4/1985 | Blake et al. . | |

OTHER PUBLICATIONS

Hardy et al., *Fructose: Comparison with Sucrose as Sweetener in Four Products*, J. Am. Dietitic Assoc. 74(1):41–46, Jan.

Herbert Stone and Shirley M. Oliver entitled "Measurement of the Relative Sweetness of Selected Sweeteners and Sweetener Mixtures" *J. Food Sci.* 34: 215–222, 1969.

Hyvonen et al., *Fructose-Saccharin and Xylitol-Saccharin Synergism*, J. Food Sci. 43:251–254, 1978.

Doty & Vanninen, *Crystalline Fructose: Use as a Food Ingredient Expected to Increase*, Food Technology 11:34–38, 1975.

Cardello et al., *Relative Sweetness of Fructose and Sucrose in Model Solutions, Lemon Beverages and White Cake*, J. Food Sci. 44:748–751.

Wettinger and Smith entitled "Effect of Sweeteners and Stabilizers on Selected Sensory Attributes and Shelf Life of Ice Cream", vol. 51, No. 6 *J. Food Sci* (1986) pp. 1463–1470.

Primary Examiner—Jeanette Hunter
Attorney, Agent, or Firm—Michael F. Campbell; James B. Guffey; J. Dan Wood

[57] ABSTRACT

A mono- and di-saccharide based sweetener composition is provided which consists essentially of a blend of fructose and sucrose. Such sweetener composition is useful for sweetening a wide variety of foodstuffs and other edible formulations. When such sweetener composition is used to sweeten foods, smaller quantities of sweetener is required as compared to that which is needed for equal sweetening power when sucrose is used as the sole sweetening ingredient.

7 Claims, No Drawings

SWEETENER COMPOSITION

BACKGROUND OF THE INVENTION

The present invention relates to the field of sweeteners and more particularly to new carbohydrate sweetener compositions.

Sweeteners are a critical ingredient in the food supply. Development of convenience oriented foods has lead to increased consumption of sweeteners. Demand for lower calorie food products has led to various attempts to reduce the sweetener contribution of calories. The primary means to accomplish this objection has been through the use of artificial or high intensity sweeteners such as saccharin and aspartame.

The use of caloric sweeteners other than sucrose such as fructose has become more common in recent years. Fructose has been reported to be from 1.0 to more than 1.8 times as sweet as sucrose when evaluated under similar conditions (Hardy et al, J. Am. Dietetic Assoc. 74(1):41–46, January, 1979). The extra sweetness of fructose has allowed the formulation of foods with equivalent sweetness to sucrose sweetened foods, but such foods would contain less sweetener and, therefore, fewer calories.

Sources of fructose for such uses have been crystalline fructose and 90% fructose corn syrup. The crystalline fructose product is expensive as compared to sucrose, while the 90% fructose corn syrup is sold only as a liquid product.

The blending of sweeteners to developed synergism has been reported by Hyvonen et al (J. Food Sci. 43:251–254, 1978). Synergism is inferred when the sweetness of a mixture is greater than the sum of its components. However, the quantitive measurement of synergism is difficult. The Hyvonen group studied synergism between fructose and saccharin and other sweeteners. They reported the synergism between fructose and saccharin was found to be the greatest when the sweeteners were present in almost equal proportions in the mixture.

A readily soluble sweetener composition was reported by Pitchen et al U.S. Pat. No. 4,303,684 issued Dec. 1, 1984. This sweetener composition contains 15 to 65% fructose, from 15–30% of low D.E. (Dextrose Equivalent) dextrinized starch and from 30 to 65% sucrose. The composition is spray dried under specific conditions to yield a low density sweetener.

Doty and Vanninen (Food Technology - (11):34–38, 1975) reported a synergistic sweetness effect between fructose and sucrose. A 10% water solution of a mixture of 60% fructose and 40% sucrose, based on solids content was reported to be about 1.3 times as sweet as a 10% pure sucrose solution and 1.1 times as sweet as a 10% pure fructose solution.

Key factors in determining the perceived sweetness and suitability of various sweeteners in foodstuffs are the effects of other food ingredients, such as acids and flavors.

The effect of acid on sweeteners has been reported by Cardello et al (J. Food Sci. 44:748–751, 1979). They summarized previous studies by stating acids have been shown to have a wide variety of effects on subjective sweetness. These researchers reported their own results by stating "in the more acidic solutions, no advantage of fructose over sucrose is found at any sugar concentration".

It is an object of this invention to provide a dry sweetener composition that has sweetness greater than sucrose so that food products containing less sweetener can be formulated. Another object is to provide a dry sweetener composition that can be formulated into food products with reduced acid and/or flavor levels as products sweetened with sucrose.

Throughout the specification and claims, all ratios and percentages are stated on a weight basis and temperatures are in degrees Celsius unless otherwise indicated.

SUMMARY OF THE INVENTION

The present invention relates to an essentially dry mono- and di-saccharide based sweetener suitable for sweetening food products wherein essentially all of the saccharide components are selected from the group consisting of fructose and sucrose, said fructose and sucrose being present in a ratio of from 1.85:1 to 1:1.85.

The sweetener composition of this invention is particularly useful in dry prepared food compositions. The sweetener composition reduces the amount of sweetener, acid and/or flavors required in food compositions.

DETAILED DESCRIPTION

The essentially dry sweetener composition of the present invention is derived from mono- and di-saccharide components. It has been found that when two specific saccharides are blended together within certain ratios, a synergistic sweetening effect results.

The two specific saccharides useful in the sweetener composition are the monosaccharide, fructose and the di-saccharide, sucrose. The form or the type of sucrose and fructose used is not critical. In general, it is preferred that both saccharides be in the crystalline form. However, it is also contemplated that saccharides dried by processes other than crystallization would be functional. It is preferred that the sucrose component be at least 90% (preferably 95% and most preferably 99%) sucrose. It is preferred that the fructose component be at least 90% (preferably 95% and most preferably 99%) fructose.

The sweetener composition may be prepared by dry blending the components or by co-processing the components to yield a dry product.

Relative Sweetness of various sweetener compounds can be evaluated by several techniques. One technique commonly used is the Relative Sweetness Test in which water-sweetener solutions containing 10% dry solids are prepared; the temperature of the solution is adjusted to about 20° C.; and the solution is evaluated by persons trained in sensory evaluation. Using such a technique, sucrose is arbitrarily defined as 100%. Other sweeteners are then ranked relative to sucrose. Fructose usually has a Relative Sweetness of about 115% as determined by this particular evaluation technique.

The sweetness of a blend of two sweeteners might be expected to be the weighted average of the relative sweetness of the two components. It has been found, however, that a synergism results when sucrose and fructose are blended together within a certain range. In one embodiment of the present invention, the range for the ratio is of sucrose to fructose is from about 1.85:1 to about 1:1.85. This is equivalent to a range of about 35–65% sucrose with fructose present in amount (35–65%) to total 100%. The Relative Sweetness of such a sweetener composition is about 120%. In a preferred embodiment, the ratio of sucrose to fructose in the sweetened is in the range of from about 1.5:1 to 1:1.5. This is equivalent to a range of about 40–60% sucrose with fructose present in an amount (40–60%) to total 100%. The Relative Sweetness of preferred composition is about 125%. In a particularly preferred embodiment, the ratio of sucrose to fructose in the sweetener is in the range of from about 1.22:1 to 1:1.22. This is equivalent to a range of about 45–55% sucrose with fructose present in an amount (45–55%) to total 100%. The Relative Sweetness of the particularly preferred composition is about 130%.

The resulting increased Relative Sweetness of the saccharide blend of this invention allows food products to be formulated with less sweetener than traditionally used when the sweetener is essentially all sucrose or all fructose. When using the sweetener composition hereof (sucrose to fructose in the range of about 1.85:1.0 to about 1.0:1.85), the amount of sweetener used in a food composition can be reduced by about 17% as compared to all sucrose sweetener. The use of the particularly preferred composition (sucrose to fructose in the range of about 1.22:1 to 1.0:1.22) allows the level is sweetener in a food composition to be reduced by as much as about 23% as compared to all sucrose sweetener.

The reduction is sweetener required for food compositions is important as it reduces the calorie contribution from the sweetener components and may have economic benefits depending upon the relative costs of sucrose and fructose.

Another benefit derived from the use of the sweetener composition of this invention is the reduced requirement for acid in certain acidified foods. Such foods include beverages (both powdered drink mix and diluted drinks), fruit flavored gelatins, flavor carriers, puddings and pie fillings (lemon, lime or other fruit flavored), fruit pies, fruit flavored yogurt, fruit fillings for baked goods, cookies and any other food product that contain sweetener and acid.

Acid levels in foods prepared with the sweetener composition of this invention can typically be reduced by about 5 or 10% as compared to the acid levels in sucrose sweetened foods. Acids typically used in acidifying such foods include citric acid, ascorbic acid, adipic acid, maleic acid, fumaric acid, succinic acid, tartaric acid, phosphoric acid, and hydrochloric acid and mixtures and sources thereof.

Still another advantage of using the sweetener composition of this invention to sweeten food products is the effect of the sweetener on added flavors. The sweetener composition of this invention allows the formulation of food products with lower levels of added flavors as compared to all sucrose sweetened foods. The sucrose-fructose sweetener combination enhances flavors of sweetened food products. The enhancement occurs with natural and imitation flavors and is particularly effective with fruit flavors.

The sweetener composition of this invention is also useful as a carrier for dried flavor systems. An example would be the spray drying of a mixture of imitation or natural flavor in an aqueous solution of sucrose and fructose. The resulting dry product could be used at reduced levels in beverages and other foods since the sucrose-fructose composition would enhance the flavor.

It has also been discovered that fructose containing sweeteners, such as the sweetener composition of this invention, have a gelatin sparing effect when used in gelatin containing foods. The level of gelatin in foods, such as gelatin dessert products, can be reduced by about 5% when a fructose containing sweetener is used as compared to all sucrose sweetener.

Baked products such as cookies, cakes, brownies and the like can be prepared with the sweetener composition. The incorporation of fructose or fructose-containing sweeteners into baked products tends to provide a smoother cake-like texture in the baked products. When sucrose is used as the sweetener in baked foods, the baked food has a slightly heavier, less cake-like texture. The sweetener composition of this invention yield baked products that have smooth, fluffier, cake-like texture with more volume than an all sucrose sweetened product. The present sweetening composition is expecially useful in dry mix baking products sold in retail stores or through food service companies for preparation by the end user. The fructose portion of the sweetener composition hereof is humectant which makes this sweetener composition an excellent humectant for baked foods and confectionery products. Baked goods prepared with the sweetener composition of this invention have a longer shelf life than baked goods prepared with sucrose as the only sweetener.

This sweetener composition hereof has also been found to have a starch sparing effect in products such as puddings, particularly instant puddings. The amount of starch used in such formulations can be reduced by about 25 to 50%, when the present sweetener blend is used to replace sucrose. The effect is more dramatic when the sweetener composition contains more fructose such as a ratio of 1.85 parts fructose to 1.0 parts sucrose. The viscosity of the finished pudding is not adversely affected. The starch reductions are particularly effective when Staley Mira-Gel 463 or for other starches, similar to Mira-Gel 463, are used to thicken the pudding or pie filling. The starch reduction also occurs when the sweetener composition is used in acidified pie fillings such as lemon, lemon-lime and similar types of fruit flavored desserts.

The sweetener composition hereof is sweet, soluble in water, stable in aqueous solutions and stable to heat processing conditions encountered in the processing of foods.

As such, they are useful for use as the sweetening ingredient in the preparation of a wide variety of materials which are intended for consumption or at least contact with the mouth of the user, such materials being herein generically designated as edible materials or foodstuffs. Typical illustrative examples of edible foodstuffs which may be sweetened according to this invention are fruits, vegetables, juices or other liquid preparations made from fruits or vegetables, meat products, particularly those conventionally treated with sweetened liquors, such as bacon and ham, milk products such as chocolate dairy drinks, egg products, such as eggnogs, custards, angel food mixes, salad dressings, pickles and relishes, ice creams, sherberts and ices, ice milk products, bakery products, icings, confections and confection toppings, syrups and flavors, cake and pastry mixes, beverages, such as carbonated soft drinks, fruit aids, wines, dietary-type foods, cough syrups and other medicinal preparations such as toothpastes, powders, foams and denture-retaining adhesives, mouth washes and similar oral antiseptic liquids, tobacco products, adhesives for gumming stamps, envelopes, labels and the like.

In using the sweetening agents of this invention, they are incorporated in the material to be sweetened in the amount required to attain the desired level of sweetness.

In general, attainment of the desired sweetness level can be achieved with as much as 23% less sweetener when this sweetener composition is used as compared to sugar or sucrose alone. Moreover, the technique of sweetening materials with the compounds of the invention offers no difficulty as the sweetening agent is simply incorporated with the material to be sweetened. The sweeteners may be added directly to the material or they may be first incorporated with a diluent to increase their bulk and added to the material. As diluent, if needed, one may use liquid or solid carriers, such as water, starch, sorbitol, salt, citric acid or other non-toxic substances compatible with the material to be sweetened.

While the invention has been described with respect to the use of the sucrose-fructose sweetening composition as the sole sweetening agent, it is to be understood that they may be used in combination with conventionally used sweetening agents, e.g., in combination with a minor amount of high intensity sweeteners such as aspartame, saccharin and the like.

While the invention has been described as mainly concerned with foodstuffs and other non-toxic formulations for human consumption, it is obviously within the scope of this invention that these sweetened compositions may be used for consumption by other creatures, such as farm and domestic animals.

Having thus described the various embodiments of the present invention, the following examples are provided to more fully illustrate those embodiments; however, without limiting the invention to specific details of such examples.

EXAMPLE 1

A sweetener blend was prepared by dry mixing 3.75 parts granulated sucrose and 3.75 parts crystalline fructose. The sweetener blend was used to prepare a dry cherry drink mix. Control formulas containing all sucrose and all fructose were also prepared for comparison purposes.

| CHERRY DRINK MIX FORMULAS | | | |
|---|---|---|---|
| | Parts | | |
| Ingredient | Sucrose Control | Fructose Control | Sucrose-Fructose Blend |
| Sucrose | 9.4 | — | — |
| Fructose | — | 8.3 | — |
| Sucrose-Fructose Blend | — | — | 7.5 |
| Citric Acid | 0.21 | 0.18 | 0.21 |
| Ascorbic Acid | 0.01 | 0.01 | 0.01 |
| Tricalcium Phosphate | 0.0015 | 0.0015 | 0.0015 |
| Maltodextrin (5 D.E.) | 0.23 | 0.23 | 0.23 |
| Color[1] | 0.0035 | 0.0035 | 0.0035 |
| Cherry Flavor[2] | 0.031 | 0.0285 | 0.031 |
| Total | 9.886 | 8.7535 | 7.986 |

[1]Warner Jenkinson Color No. 7425
[2]Universal Flavors

The above dry mixes were prepared by dry blending all ingredients. Ready to serve drinks were prepared by adding sufficient water to each sample so that the total weight is 100 parts. The sweetness level of each of the three beverages was comparable, even though the sucrose-fructose sweetened beverage contained 20.2% less sweetener than the sucrose sweetened control and 9.6% less sweetener than the fructose sweetened control. The caloric content of a 100 g serving of the sucrose sweetened cherry beverage is about 39 calories while the caloric content of the sucrose-fructose sweetened cherry beverage is about 32 calories, which is about an 18% reduction in calories.

EXAMPLE 2

A sweetener blend was prepared using 53 parts sucrose and 47 parts crystalline fructose. This blend was used to prepare a gelatin dessert product. Sucrose and fructose sweetened controls were prepared for comparison purposes.

| ORANGE GELATIN DESSERT MIX PRODUCTS | | | |
|---|---|---|---|
| | Parts | | |
| Ingredient | Sucrose Control | Fructose Control | Sucrose-Fructose Blend |
| Sucrose | 13.16 | — | — |
| Fructose | — | 12.02 | — |
| Sucrose-Fructose Blend | — | — | 10.66 |
| Gelatin | 1.47 | 1.41 | 1.47 |
| Adipic Acid | 0.26 | 0.25 | 0.26 |
| Disodium Phosphate | 0.20 | 0.20 | 0.20 |
| Fumaric Acid | 0.18 | 0.176 | 0.18 |
| Orange Shade Color | 0.001 | 0.001 | 0.001 |
| Orange Flavor | 0.031 | 0.029 | 0.031 |
| Total | 15.302 | 14.086 | 12.802 |
| Water added to prepare ready-to-serve gelatin dessert (parts) | 84.698 | 85.914 | 87.198 |

The dry gelatin mixes were prepared by dry blending all ingredients. Ready to serve gelatin was prepared by adding the dry mix to the appropriate amount of boiling water, stirring and allowing to set. Sensory evaluation of the three gelatin products showed all 3 products have equivalent sweetness. A 100 g serving of the sucrose-fructose sweetened gelatin dessert contains about 16.5% fewer calories than the sucrose sweetened gelatin dessert and 9.3% fewer calories than the fructose sweetened gelatin dessert.

EXAMPLE 3

The sweetener blend of Example 1 is used to prepare a reduced acid ingredient and reduced flavor ingredient version of the Cherry drink mix product of Example 1. A beverage is prepared using the following formula.

| Ingredient | Parts |
|---|---|
| Sucrose-fructose blend | 7.5 |
| Citric Acid | 0.18 |
| Asorbic Acid | 0.01 |
| Tricalcium phosphate | 0.0015 |
| Maltodextrin (5 D.E.) | 0.23 |
| Color[1] | 0.0035 |
| Cherry Flavor | 0.0285 |
| | 7.9335 |
| Water | 92.0465 |
| | 100.0 |

[1]Warner-Jenkinson Color No. 7425

The sucrose-fructose sweetened formula contains 14.2% less citric acid and 8% less flavor than the all sucrose sweetened formula of Example 1. The perceived sweetness-acidity flavor evaluation is similar to that of the sucrose sweetened control described in Example 1.

EXAMPLE 4

The sweetener blend of Example 1 is used to prepare a brownie product. The following ingredients were used to prepare a brownie mix:

| Ingredient | Parts |
| --- | --- |
| Sucrose-Fructose blend | 191.21 |
| Powdered Shortening | 69.55 |
| Cake Flour | 43.73 |
| All Purpose Flour | 62.73 |
| Maltodextrin 20 D.E. | 74.75 |
| Cocoa | 31.05 |
| Starco TM 447 Starch[1] | 6.44 |
| Dried Egg White | 3.19 |
| Salt | 2.54 |
| Dry Vanilla Flavor | 1.76 |
| Baking Soda | 0.13 |
| | 487.08 |

[1] A. E. Staley Manufacturing Company

The above ingredients are dry blended in a mixing bowl. The following ingredients are then added and well blended with minimum beating.

| Ingredient | Parts |
| --- | --- |
| Corn Oil | 45.37 |
| Whole Egg | 35.95 |
| Water | 84.5 |
| Hershey Chocolate Syrup | 10.0 |
| | 175.82 |

The mixture was baked in a 190° C. oven for 30 minutes. The resulting brownies were sweet and had a smooth, cake-like texture.

EXAMPLE 5

Instant dry mix vanilla pudding was prepared using the sweetener blend of this invention and compared to all sucrose or all fructose sweetened vanilla puddings. The following formulations were prepared:

| Ingredient | Sucrose Sweetened | Fructose Sweetened | Sucrose-Fructose Sweetened |
| --- | --- | --- | --- |
| Sucrose | 74.0 | — | 34.0 |
| Fructose | — | 74.0 | 29.0 |
| Durem 114 emulsifier[1] | 0.5 | 0.5 | 0.5 |
| Vegetable Oil | 0.5 | 0.5 | 0.5 |
| Disodium Phosphate | 0.6 | 0.6 | 0.6 |
| Tetrasodium Phosphate | 1.0 | 1.0 | 1.0 |
| Salt | 0.5 | 0.5 | 0.5 |
| Color (No. 8038 egg shade)[2] | 0.4 ml. | 0.4 ml. | 0.4 ml. |
| Imitation Vanilla Flavor | 3.0 ml. | 3.0 ml. | 3.0 ml. |
| STARCO TM 447 Starch[3] | 20.0 | 17.5 | 18.4 |
| | 100.5 | 98.0 | 87.9 |

[1] Durkee Foods
[2] Warner-Jenkinson
[3] A. E. Staley Manufacturing Company

A dry mix instant pudding composition was prepared by melting the Durem emulsifier and vegetable oil together and then coating the oil-emulsifier onto the sweetener component when mixing with household mixer at low speed. The remaining dry ingredients were added and mixed into the oil-sweetener mixture.

A ready-to-serve pudding dessert was then prepared from each dry mix by adding each dry mix pudding composition to 450 ml. of cold milk and mixing with mixer set at low speed. The pudding was mixed for two minutes and poured into serving cups. The ready to eat puddings had similar sweetness and viscosity levels. The sweetener blend comprising 54% sucrose and 46% fructose had a sweetness equivalent to the all fructose or all sucrose sweetened puddings even though 14% less sweetener was used. Additionally, the use of fructose sweetener allowed the reduction in the amount of starch used in the pudding formulations. The all fructose sweetened pudding contained 12.5% less starch and the sucrose-fructose sweetened pudding contained 8% less starch than the all sucrose pudding. The combination of less sweetener and less starch in the pudding sweetened with the sweetener of the invention provides the basis for a reduced calorie food product as compared to the sucrose sweetened control.

The foregoing description and examples illustrate selected embodiments of the present invention and in light thereof, variations, modifications will be apparent to one skilled in the art all of which are within the spirit and purview of this invention.

What is claimed is:

1. An essentially dry, mono- and di- saccharide based sweetener composition suitable for sweetening food products wherein essentially all of the saccharide components are selected from the group consisting of fructose and sucrose, said fructose and sucrose present in a ratio of from 1.85:1 to 1:1.85.

2. The sweetener composition of claim 1 wherein said fructose and sucrose are present in a ratio of from 1.5:1 to 1:1.5.

3. The sweetener composition of claim 1 wherein said fructose and sucrose are present in a ratio of from 1.22:1 to 1:1.22.

4. The sweetener composition of claim 1 wherein said fructose is crystalline fructose and said sucrose is crystalline sucrose.

5. A process for the preparation of a sweetened edible formulation in which less sweetener is required than if sucrose is the sweetening agent comprising the step of mixing a food stuff with a sweetener composition consisting essentially of fructose and sucrose, said fructose and sucrose present in a ratio of from 1.85:1 to 1:1.85, in an amount sufficient to sweeten said foodstuff.

6. A process of claim 5, wherein the foodstuff is an acidified foodstuff and wherein the amount of acid employed is at least 5& less than that required when the foodstuff is sweetened with sucrose.

7. A process of claim 5, wherein the foodstuff contains added flavor ingredients and wherein the level of added flavor ingredient employed is at least 5% less than that required when the foodstuff is sweetened with sucrose.

* * * * *

UNITED STATES PATENT AND TRADEMARK OFFICE
CERTIFICATE OF CORRECTION

PATENT NO. : 4,676,991

DATED : June 30, 1987

INVENTOR(S) : Cynthia K. Batterman et al.

It is certified that error appears in the above-identified patent and that said Letters Patent are hereby corrected as shown below:

Column 3, line 25; for "reduction is" read ---reduction in---
Column 4, line 23; for "This" read ---The---
Column 8, line 52; for "5&" read ---5%---

Signed and Sealed this

Fifteenth Day of December, 1987

Attest:

DONALD J. QUIGG

*Attesting Officer*     *Commissioner of Patents and Trademarks*